US012584389B2

(12) United States Patent　　　(10) Patent No.:　　US 12,584,389 B2
Balasubramanian et al.　　　　　(45) Date of Patent:　　　Mar. 24, 2026

(54) INJECTION PRESSURE OPERATED GAS LIFT VALVE AND METHODS OF USE

(71) Applicant: Schlumberger Technology Corporation, Sugar Land, TX (US)

(72) Inventors: Ganesh Balasubramanian, Houston, TX (US); Ananthakumar P. Ramachandran, Singapore (SG); Junhong Song, Singapore (SG); Jingyi Xie, Singapore (SG); Yoon Kion John Lee, Singapore (SG); Benoit Deville, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/833,426

(22) PCT Filed: Mar. 14, 2023

(86) PCT No.: PCT/US2023/064281

§ 371 (c)(1),
(2) Date: Jul. 26, 2024

(87) PCT Pub. No.: WO2023/178064

PCT Pub. Date: Sep. 21, 2023

(65) Prior Publication Data

US 2025/0179899 A1　　　Jun. 5, 2025

Related U.S. Application Data

(60) Provisional application No. 63/269,270, filed on Mar. 14, 2022.

(51) Int. Cl.
| *E21B 43/12* | (2006.01) |
| *F16K 31/126* | (2006.01) |
| *F16K 41/10* | (2006.01) |

(52) U.S. Cl.
CPC .......... *E21B 43/123* (2013.01); *F16K 31/126* (2013.01); *F16K 41/10* (2013.01); *Y10T 137/2836* (2015.04); *Y10T 137/2934* (2015.04)

(58) Field of Classification Search
CPC ...... E21B 43/123; F16K 31/126; F16K 41/10; Y10T 137/2836; Y10T 137/2934
See application file for complete search history.

(56) References Cited

U.S. PATENT DOCUMENTS

| 1,029,473 A | 6/1912 | Slaughter |
| 2,880,620 A | 4/1959 | Bredtschneider |
| (Continued) | | |

FOREIGN PATENT DOCUMENTS

| BR | 112015018534 A2 | 8/2017 |
| EP | 3026210 A1 | 6/2016 |
| WO | 2016093706 A1 | 6/2016 |

OTHER PUBLICATIONS

Search Report and Written Opinion of International Application No. PCT/US2023/064281 dated Jun. 29, 2023, 12 pages.

*Primary Examiner* — George S Gray
(74) *Attorney, Agent, or Firm* — Jeffrey D. Frantz

(57) ABSTRACT

An IPO gas lift valve. The IPO gas lift valve may include a dome assembly, a bellows system coupled to the dome assembly, a valve assembly, and a check valve assembly coupled to the valve assembly. The bellows system may include a liquid-filled sealed chamber, a piston positioned within the sealed chamber and dividing the sealed chamber into a dome side and a valve side, a first bellows assembly positioned within the dome side of the sealed chamber, and a second bellows assembly positioned within the valve side of the sealed chamber. The valve assembly may be operable to shift the IPO gas lift valve between an open position and a closed position.

19 Claims, 4 Drawing Sheets

(56)  References Cited

U.S. PATENT DOCUMENTS

| | | | |
|---|---|---|---|
| 3,306,313 A * | 2/1967 | Roach | E21B 43/123 |
| | | | 137/155 |
| 4,128,106 A | 12/1978 | Abercrombie | |
| 5,662,335 A | 9/1997 | Larsen | |
| 7,370,706 B2 | 5/2008 | Becker et al. | |
| 8,701,779 B2 | 4/2014 | Kleppa et al. | |
| 9,010,353 B2 | 4/2015 | Salihbegovic | |
| 9,057,255 B2 | 6/2015 | Juenke | |
| 9,512,835 B2 | 12/2016 | Casella | |
| 9,518,674 B2 | 12/2016 | Reed et al. | |
| 9,519,292 B2 | 12/2016 | Thorne et al. | |
| 9,605,521 B2 | 3/2017 | Salihbegovic | |
| 9,611,720 B2 | 4/2017 | Sevheim | |
| 9,879,509 B2 | 1/2018 | De Almeida | |
| 9,988,886 B2 * | 6/2018 | Salihbegovic | F16K 41/10 |
| 10,161,232 B2 | 12/2018 | Salihbegovic et al. | |
| 11,242,732 B2 | 2/2022 | Salihbegovic | |
| 2004/0182437 A1 * | 9/2004 | Messick | E21B 43/123 |
| | | | 137/155 |
| 2014/0069659 A1 * | 3/2014 | Wang | E21B 43/123 |
| | | | 166/321 |
| 2017/0152733 A1 | 6/2017 | Salihbegovic | |
| 2020/0182027 A1 | 6/2020 | Romer et al. | |
| 2021/0054725 A1 | 2/2021 | Salihbegovic | |
| 2021/0086248 A1 | 3/2021 | Salihbegovic | |
| 2021/0172300 A1 | 6/2021 | Rodger | |

* cited by examiner

INJECTION PRESSURE OPERATED GAS LIFT VALVE AND METHODS OF USE

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is a National Stage Entry of International Application No. PCT/US2023/064281, filed Mar. 14, 2023, which claims priority benefit of U.S. Provisional Application No. 63/269,270, filed Mar. 14, 2022, the entirety of which is incorporated by reference herein and should be considered part of this specification.

BACKGROUND

Oil and gas wells utilize a borehole drilled into the earth and subsequently completed with equipment to facilitate production of desired fluids from a reservoir. Subterranean fluids, such as oil, gas, and water, are produced from the wellbore. In some cases, the fluid is produced to the surface naturally by downhole formation pressures.

However, the fluid must often be artificially lifted from wellbores by the introduction of downhole equipment. Various types of artificial lift are available. In a gas lift system, a compressor is located on the surface. The compressor pumps gas down the casing tubing annulus. The gas is then released into the production tubing via gas valves that are strategically placed throughout the production tubing. The gas that is introduced lightens the hydrostatic weight of the fluid in the production tubing, allowing the reservoir pressure to lift the fluid to surface.

SUMMARY

An Injection Pressure Operated (IPO) gas lift valve for use within a tubular according to one or more embodiments of the present disclosure includes a dome assembly, a bellows system coupled to the dome assembly, a valve assembly, and a check valve assembly coupled to the valve assembly. The bellows system includes a liquid-filled sealed chamber, a piston positioned within the sealed chamber and dividing the sealed chamber into a dome side and a valve side, a first bellows assembly in fluid communication with the dome assembly and positioned within the dome side of the sealed chamber, and a second bellows assembly positioned within the valve side of the sealed chamber. A volume of a liquid-filled portion of the dome side is constant regardless of the position of the bellows assembly and a volume of a liquid-filled portion of the valve side is constant regardless of the position of the bellows assembly. The valve assembly is in fluid communication with the second bellows assembly and operable to shift the IPO gas lift valve between an open position and a closed position and includes a valve stem coupled to the piston and including a seal portion, and a valve seat having an outlet and shaped to receive the seal portion of the valve stem when the IPO gas lift valve is in the closed position.

A gas lift system for use within a well according to one or more embodiments of the present disclosure includes a tubular string disposable within the wellbore and an IPO gas lift valve positioned within the tubular. The IPO gas lift valve includes a dome assembly, a bellows system coupled to the dome assembly, a valve assembly, and a check valve assembly coupled to the valve assembly. The bellows system includes a liquid-filled sealed chamber, a piston positioned within the sealed chamber and dividing the sealed chamber into a dome side and a valve side, a first bellows assembly in fluid communication with the dome assembly and positioned within the dome side of the sealed chamber, and a second bellows assembly positioned within the valve side of the sealed chamber. A volume of a liquid-filled portion of the dome side is constant regardless of the position of the bellows assembly and a volume of a liquid-filled portion of the valve side is constant regardless of the position of the bellows assembly. The valve assembly is in fluid communication with the second bellows assembly and operable to shift the IPO gas lift valve between an open position and a closed position and includes a valve stem coupled to the piston and including a seal portion, and a valve seat having an outlet and shaped to receive the seal portion of the valve stem when the IPO gas lift valve is in the closed position.

An Injection Pressure Operated (IPO) gas lift valve for use within a tubular according to one or more embodiments of the present disclosure includes a dome assembly, a bellows system coupled to the dome assembly, a valve assembly, and a check valve assembly coupled to the valve assembly. The bellows system includes a piston dividing the bellows system into a dome side and a valve side, a first bellows assembly positioned within the dome side of bellows system and in fluid communication with the dome assembly, and a second bellows assembly positioned within the valve side of the bellows system. The valve assembly is in fluid communication with the second bellows assembly and operable to shift the IPO gas lift valve between an open position and a closed position and includes a housing comprising an upper housing coupled to a lower housing, wherein one or more spacers are positioned between the upper housing and the lower housing, and the one or more spacers sized such that the second bellows assembly is in a fully nested position when the IPO gas lift valve is closed. The valve assembly further includes a valve stem positioned within the housing, coupled to the piston and including a seal portion, and a valve seat having an outlet and shaped to receive the seal portion of the valve stem when the IPO gas lift valve is in the closed position.

A gas lift system for use within a well according to one or more embodiments of the present disclosure includes a tubular string disposable within the wellbore and an IPO gas lift valve positioned within the tubular. The IPO gas lift valve includes a dome assembly, a bellows system coupled to the dome assembly, a valve assembly, and a check valve assembly coupled to the valve assembly. The bellows system includes a piston dividing the bellows system into a dome side and a valve side, a first bellows assembly positioned within the dome side of bellows system and in fluid communication with the dome assembly, and a second bellows assembly positioned within the valve side of the bellows system. The valve assembly is in fluid communication with the second bellows assembly and operable to shift the IPO gas lift valve between an open position and a closed position and includes a housing comprising an upper housing coupled to a lower housing, wherein one or more spacers are positioned between the upper housing and the lower housing, and the one or more spacers sized such that the second bellows assembly is in a fully nested position when the IPO gas lift valve is closed. The valve assembly further includes a valve stem positioned within the housing, coupled to the piston and including a seal portion, and a valve seat having an outlet and shaped to receive the seal portion of the valve stem when the IPO gas lift valve is in the closed position.

A method for producing formation fluids from a formation according to one or more embodiments of the present disclosure includes biasing an IPO gas lift valve in a closed position via pressurized gas within a dome assembly of the IPO gas lift valve. The dome assembly in fluid communication with a first bellows assembly of a bellows system of the IPO gas lift valve. The first bellows assembly is positioned within a dome side of a liquid-filled sealed chamber of the bellows system. The volume of a liquid-filled portion of the dome side is constant regardless of the position of the first bellows assembly. The method also includes positioning a tubular string comprising the IPO gas lift valve within a wellbore extending through the formation. The method further includes injecting gas into the well to pressurize a second bellows assembly of the bellows system and open the IPO gas lift valve. The second bellows assembly is positioned within a valve side of a liquid filled sealed chamber, the valve side separated from the dome side via a piston. The volume of a liquid-filled portion of the valve side is constant regardless of the position of the second bellows assembly.

A method for producing formation fluids from a formation according to one or more embodiments of the present disclosure includes biasing an IPO gas lift valve in a closed position via pressurized gas within a dome assembly of the IPO gas lift valve. The dome assembly in fluid communication with a first bellows assembly of a bellows system of the IPO gas lift valve. The first bellows assembly is positioned within a dome side the bellows system. The method further includes positioning a second bellows assembly of the bellows system in a fully nested position when the IPO gas lift valve is in the closed position via spacers positioned between an upper housing of a valve assembly of the IPO gas lift valve and a lower housing of the valve assembly of the IPO gas lift valve. The second bellows assembly is positioned within a valve side of the bellows system. The valve side is separated from the dome side via a piston. The method also includes positioning a tubular string comprising the IPO gas lift valve within a wellbore extending through the formation. The method further includes injecting gas into the well to pressurize the second bellows assembly and open the IPO gas lift valve.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various described technologies. The drawings are as follows.

DETAILED DESCRIPTION

In the following description, numerous details are set forth to provide an understanding of some embodiments of the present disclosure. However, it will be understood by those of ordinary skill in the art that that embodiments of the present disclosure may be practiced without these details and that numerous variations or modifications from the described embodiments may be possible.

In the specification and appended claims: the terms "connect," "connection," "connected," "in connection with," "connecting," "couple," "coupled," "coupled with," and "coupling" are used to mean "in direct connection with" or "in connection with via another element." As used herein, the terms "up" and "down," "upper" and "lower," "upwardly" and "downwardly," "upstream" and "downstream," "uphole" and "downhole," "above" and "below," and other like terms indicating relative positions above or below a given point or element are used in this description to more clearly describe some embodiments of the disclosure.

Gas Lift utilizes energy from pressurized natural gas that is injected into the production tubing through the casing annulus and regulated through a gas lift valve to accomplish artificial lifting of production fluids. Injected gas reduces fluid density in the wellbore. This lightens the hydrostatic column and decreases the flowing bottom hole pressure (FBHP). As a result of this drop in back pressure/load on formation, drawdown from the reservoir increases as produced fluids are lifted.

Figure 1:
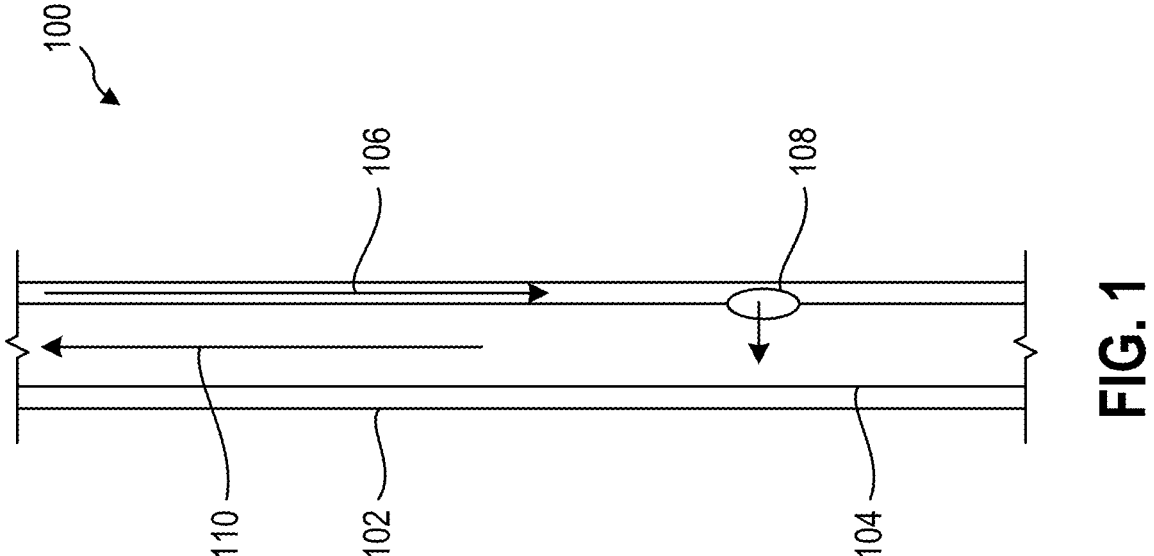
FIG. 1 is a gas lift system according to one or more embodiments of the present disclosure.

FIG. 1 schematically illustrates an example gas lift system 100. The gas lift system 100 includes a compressor located at the well surface. In use, the compressor pumps gas down the annulus between the casing 102 and the tubing 104, as indicated by arrow 106. The gas is then released into the tubing 104 via one or more gas valves 108 that are strategically placed throughout the tubing 104. The gas lessens the hydrostatic weight of the fluid in the tubing 104, allowing the reservoir pressure to lift the fluid to the surface, as indicated by arrow 110.

Deeper the injection point of gas in the well results in a greater drawdown and a higher the production rate. However, to achieve this, several gas lift stations are required to unload the well from the surface to the injection point. This is accomplished through unloading valves in each of the gas lift stations and an injection/operating valve in the bottom most station.

Gas lift valves assist in unloading of the well and in continuous or intermittent injection of gas into produced reservoir fluids. Unloading gas lift valves can be broadly classified as Injection Pressure Operated (IPO) valves that are primarily sensitive to annulus pressure and Production Pressure Operated (PPO) valves that that are primarily sensitive to tubing pressure.

Figure 2:
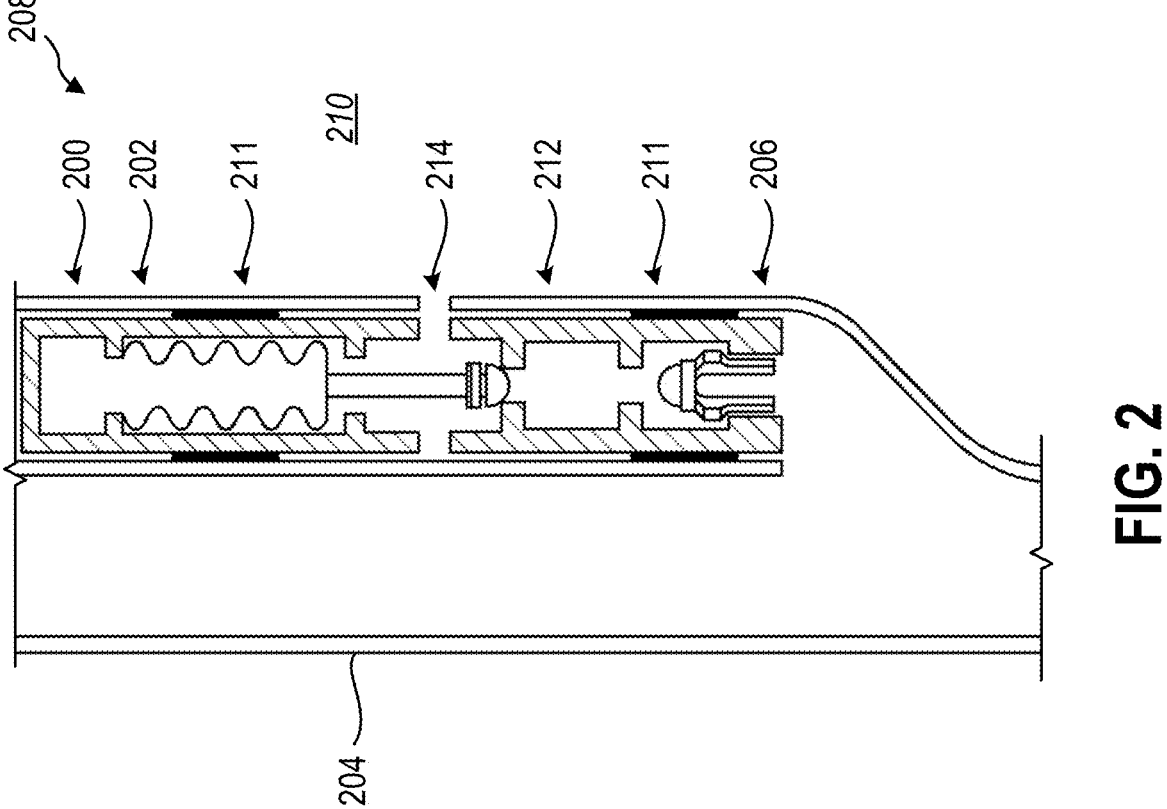
FIG. 2 is a schematic view of an Injection Pressure Operated (IPO) gas lift valve according to one or more embodiments of the present disclosure.

Turning now to FIG. 2, FIG. 2 is a schematic view of an IPO gas lift valve 208 according to one or more embodiments of the present disclosure. The IPO gas lift valve 208 includes a dome assembly 200 and a bellows system 202 that are charged with nitrogen or another suitable gas to a pressure that is determined based on the depth of the installation of the IPO gas lift valve and other well conditions. The IPO gas lift valve further includes a check valve assembly 206 or similar mechanism positioned to prevent flow from the tubing 204 to the annulus 210 through the IPO gas lift valve 208 and two seal stacks 211 positioned to a seal between the IPO gas lift valve 208 and the tubular 204 and isolate an injection inlet port 214. The pressure within the dome assembly 200 and the bellows system 202 biases the
valve assembly 212 coupled to the bellows system 202 to a
closed position, as shown in FIG. 2. When gas is injected
into the well and enters the IPO gas lift valve 208 through
the injection inlet port 214, the combined pressure of the
injected gas and the pressure of the fluid within the tubing
204 acts to open the IPO gas lift valve 208 and allow the
injected the gas to enter the tubing 204.

In a well with IPO gas lift valves 208 installed in the gas
lift stations, as the well is unloaded from the top, with the
corresponding fluid columns getting lighter as it approaches
the surface, thus decreasing the pressure within the tubing
204. Accordingly, the IPO gas lift valves 208 close from top
to bottom of the well as the tubing pressure decreases. The
bottom-most gas lift station in the well may include an
operating valve, also known as an orifice valve. The oper-
ating valve is intended to be positioned at the deepest gas
injection point in the well. Similar to the IPO gas lift valve,
an operating valve includes a check valve assembly 206 to
prevent flow from the tubing 204 into the annulus 210.
However, the operating valve does not have the bellow
section or dome assembly to bias the valve closed, as the
operating valve does not perform the function of unloading.

Figure 3:
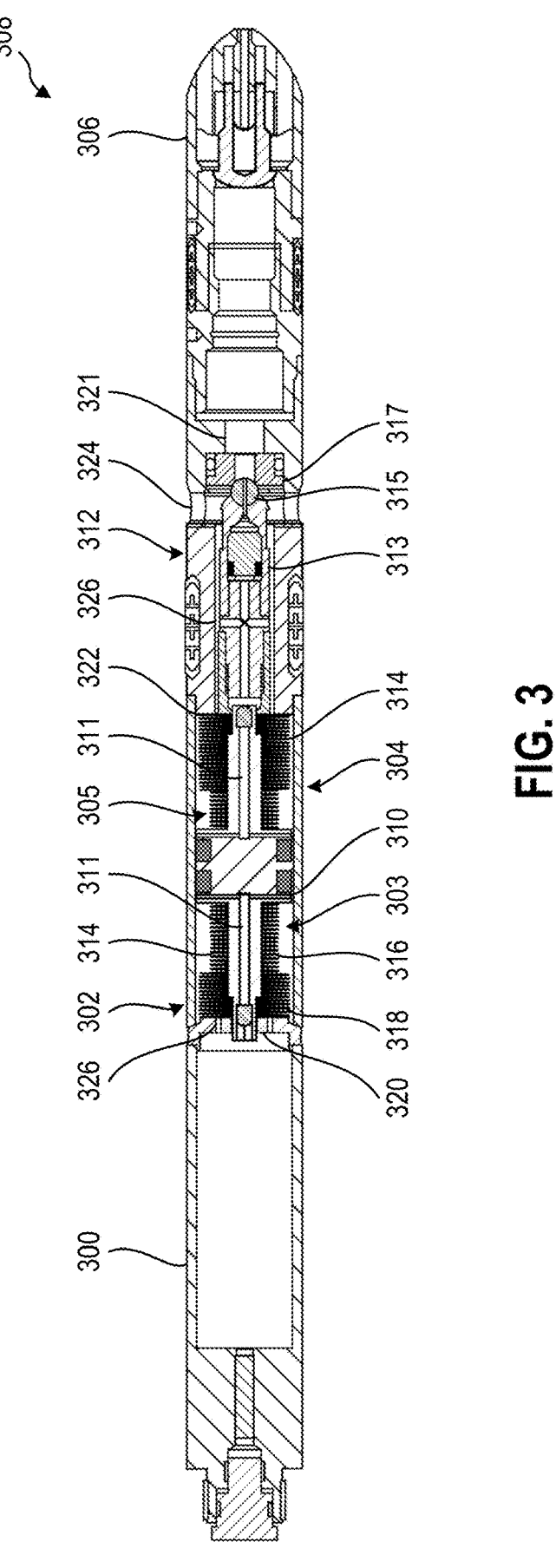
FIG. 3 is a cross-sectional view of an IPO gas lift valve according to one or more embodiments of the present disclosure.

Turning now to FIG. 3, FIG. 3 is a cross-sectional view of
an IPO gas lift valve 308 according to one or more embodi-
ments of the present disclosure. Similar to the IPO gas lift
valve 208 discussed above with respect to FIG. 2, the IPO
gas lift valve 308 includes a dome assembly 300, a bellows
system 302, a valve assembly 312 coupled to the bellows
system 302 to open and close the IPO gas lift valve 308, and
a check valve assembly 306 positioned downstream of the
valve assembly 312 to prevent flow from the tubing to the
annulus surrounding the tubing through the IPO gas lift
valve 308.

In one or more embodiments, the bellows system 302 is
coupled to the dome assembly 300 and includes a sealed
chamber 304. A piston 310 is disposed within the sealed
chamber 304, dividing the sealed chamber 304 into a dome
side 303 and a valve side 305. The piston 310 is coupled to
the valve assembly 312 and a bellows assembly is disposed
within each side 303, 305 of the sealed chamber. Each of the
sides 303, 305 of the sealed chamber 304 is filled with a
liquid, such as, but not limited to, hydraulic fluid, that
surrounds the respective bellows assembly 314. In one or
more embodiments, the liquid is flowed into each side 303,
305 of the sealed chamber 304 via flow paths 311 formed in
the piston 310.

Each of the bellows assemblies 314 includes a first
bellows 316 coupled to and sealed against the piston 310 and
a second bellows 318 coupled to and sealed against the first
bellows 316 at a first end and coupled to and sealed against
a cap 320, 322, at a second end. In the embodiment shown
in FIG. 3, the first bellows 316 has a smaller diameter than
the second bellows 318; however, the invention is not
thereby limited. In other embodiments, the first bellows 316
may have a larger diameter than the second bellows 318.

The bellows 316, 318 of the bellows assembly 314 are
sized such that the volume of liquid-filled portion of the
respective side 303, 305 of the sealed chamber 304 is
constant. Said another way, the volume of the respective side
303, 305 of the sealed chamber 304 that is not occupied by
a bellows assembly 314 does not change regardless of the
position of the bellows assembly 314 within the side 303,
305. The constant volume of the liquid-filled portion respec-
tive side 303, 305 of the sealed chamber 304 reduces or
prevents a pressure differential from occurring across the respective bellows assemblies 314 as they expand and
contract due to internal pressure.

In the closed position, shown in FIG. 3, the pressurized
gas within the dome assembly 300 enters the dome side
bellows assembly 314 via flow paths 326 in the dome cap
320 and expands the bellows assembly 314 to bias the valve
assembly 312 into the closed position where a seal portion
315 of the valve stem 313 contacts the valve seat 317 to
block an outlet 321 of the valve assembly and prevent flow
through the IPO gas lift valve 308. When gas is injected into
the well, the gas flows through one or more injection inlet
ports 324 of the valve assembly 312 and into the valve side
bellows assembly 314 via a flow path 326 in the valve cap
322.

Once the force on the valve assembly side of the piston
310 due to the injected gas pressure and the tubing pressure
increases above the force due to the pressure within the
dome assembly 300, the piston 310 shifts towards the dome
assembly 300. The movement of the piston 310 shifts the
valve stem 313 away from the valve seat 317 and opens the
IPO gas lift valve 308. When the force decreases below the
force due to the pressure within the dome assembly 300, the
seal portion 315 of the valve stem 313 seals against the valve
seat 317 to close the IPO gas lift valve 308.

Figure 4:
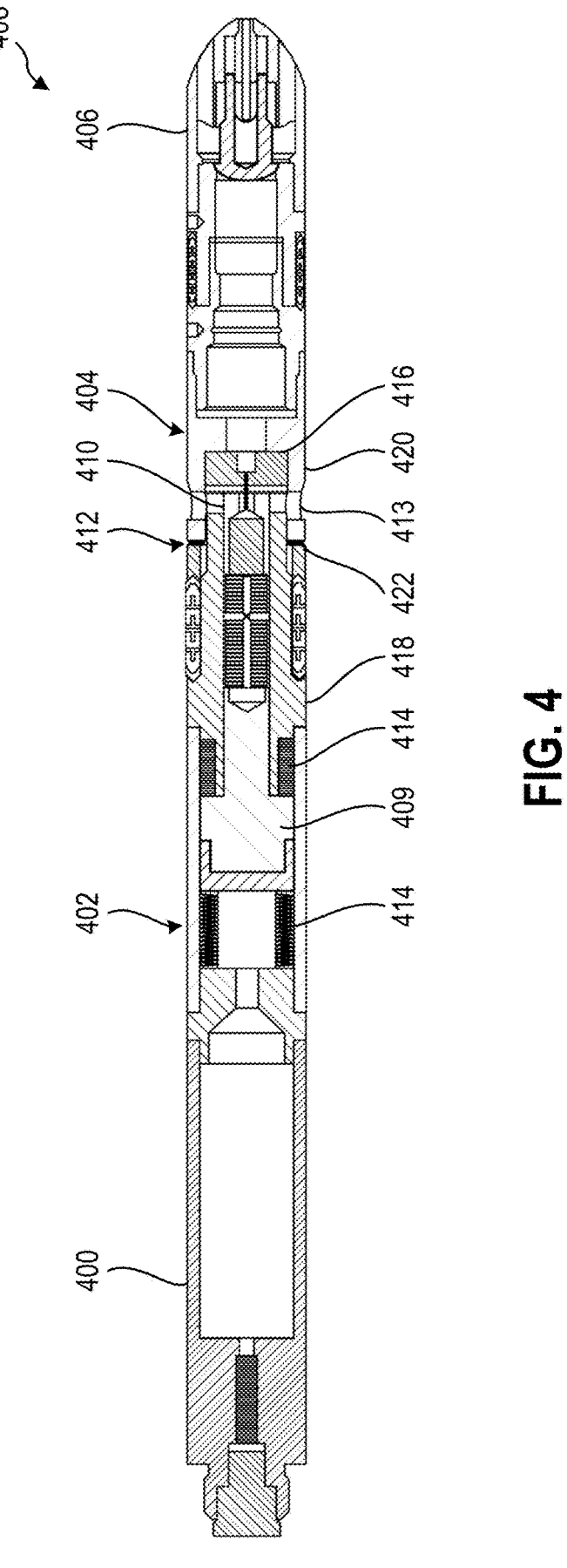
FIG. 4 is a cross-sectional view of an IPO gas lift valve according to one or more embodiments of the present disclosure.

Turning now to FIG. 4, FIG. 4 is a cross-sectional view of
an IPO gas lift valve 408 according to one or more embodi-
ments of the present disclosure. Similar to the IPO gas lift
valves 208, 308 discussed above with respect to FIGS. 2 and
3, the IPO gas lift valve 408 includes a dome assembly 400,
a bellows system 402, a valve assembly 412 coupled to the
bellows system 402 to open and close the IPO gas lift valve
408, and a check valve assembly 406 positioned down-
stream of the valve assembly 412 to prevent flow from the
tubing to the annulus surrounding the tubing through the
IPO gas lift valve 408.

Similar to IPO gas lift valves 208, 308 described above,
the dome assembly side bellows 414 is in fluid communi-
cation with the dome assembly and the valve side bellows
assembly 414 is in fluid communication with the injection
inlet port 413 of the valve assembly 412 to shift the IPO gas
lift valve 408 between the open position and the closed
position via a valve stem 410 of the valve assembly 412 that
is coupled to a piston 409 of the bellows assembly. However,
unlike the IPO gas lift valve 308 described above, the
bellows assemblies 414 are not enclosed within a fluid-filled
chamber. Due to this, the valve side bellows assembly 414
is subject to differential pressure while the IPO gas lift valve
408 is in the closed position. This differential pressure can
reduce the longevity of the valve side bellows assembly 414
if the bellows assembly 414 is in a partially expanded
position when the IPO gas lift valve 408 is in the closed
position, i.e., the valve stem 410 is contacting the valve seat
416, instead of the fully nested position shown in FIG. 4.

To ensure the valve side bellows assembly 414 is fully
nested when the valve stem 410 is contacting the valve seat
416, the valve assembly 412 includes a split housing 404
having an upper housing 418 coupled to a lower housing 420
such that one or more spacers 422 can be positioned between
the upper housing 418 and the lower housing 41. The spacers
422 allow for adjustment of the axial length of the housing
404 to position the valve side bellows assembly 414 in the
fully nested position when the valve stem seal 410 is
contacting the seat 416.

As used herein, a range that includes the term between is
intended to include the upper and lower limits of the range;
e.g., between 50 and 150 includes both 50 and 150. Addi-
tionally, the term "approximately" includes all values within 5% of the target value; e.g., approximately 100 includes all values from 95 to 105, including 95 and 105. Further, approximately between includes all values within 5% of the target value for both the upper and lower limits; e.g., approximately between 50 and 150 includes all values from 47.5 to 157.5, including 47.5 and 157.5.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An Injection Pressure Operated (IPO) gas lift valve for use within a tubular, the IPO gas lift valve comprising:
   a dome assembly;
   a bellows system coupled to the dome assembly, and comprising:
      a liquid-filled sealed chamber;
      a piston positioned within the liquid-filled sealed chamber and dividing the liquid-filled sealed chamber into a dome side and a valve side;
      a first bellows assembly in fluid communication with the dome assembly and positioned within the dome side of the liquid-filled sealed chamber;
      a second bellows assembly positioned within the valve side of the liquid-filled sealed chamber; and
   wherein:
      a dome-side volume of a liquid-filled portion of the dome side is constant regardless of a position of the bellows system; and
      a valve-side volume of a liquid-filled portion of the valve side is constant regardless of the position of the bellows system; and
   a valve assembly in fluid communication with the second bellows assembly and operable to shift the IPO gas lift valve between an open position and a closed position and comprising:
      a valve stem coupled to the piston and comprising a seal portion;
      a valve seat having an outlet and shaped to receive the seal portion of the valve stem when the IPO gas lift valve is in the closed position; and
      a check valve assembly coupled to the valve assembly.

2. The IPO gas lift valve of claim 1, wherein:
   the first bellows assembly and the second bellows assembly each include a first bellows and a second bellows; and
   a first diameter of the first bellows is greater than a second diameter of the second bellows.

3. The IPO gas lift valve of claim 1, wherein the check valve assembly is positioned downstream of the outlet.

4. The IPO gas lift valve of claim 1, further comprising a pair of seal stacks positioned to create a seal between the IPO gas lift valve and the tubular.

5. A gas lift system for use within a well, the gas lift system comprising:
   a tubular positionable within the well; and
   an IPO gas lift valve positioned within the tubular and comprising:
      a dome assembly;
      a bellows system coupled to the dome assembly, and comprising:
         a liquid-filled sealed chamber;

a piston positioned within the liquid-filled sealed chamber and dividing the liquid-filled sealed chamber into a dome side and a valve side;
      a first bellows assembly positioned within the dome side of the liquid-filled sealed chamber and in fluid communication with the dome assembly, wherein the first bellows assembly includes a first dome side bellow and a second dome side bellow, the first dome side bellow having a first dome side diameter that is less than a second dome side diameter of the second dome side bellow; and
      a second bellows assembly positioned within the valve side of the liquid-filled sealed chamber, wherein the second bellows assembly includes a first valve side bellow and a second valve side bellow, the first valve side bellow having a first valve side diameter that is less than a second valve side diameter of the second valve side bellow; and
   a valve assembly in fluid communication with the second bellows assembly and operable to shift the IPO gas lift valve between an open position and a closed position and comprising:
      a valve stem coupled to the piston and comprising a seal portion;
      a valve seat having an outlet and shaped to receive the seal portion of the valve stem when the IPO gas lift valve is in the closed position; and
      a check valve assembly coupled to the valve assembly.

6. The gas lift system of claim 5, wherein the check valve assembly is positioned downstream of the outlet.

7. The gas lift system of claim 5, wherein the IPO gas lift valve further comprises a pair of seal stacks positioned to create a seal between the IPO gas lift valve and the tubular.

8. The gas lift system of claim 7, wherein the seal stacks are further positioned to isolate an injection inlet port of the IPO gas lift valve from the tubular.

9. An IPO gas lift valve for use within a tubular, the IPO gas lift valve comprising:
   a dome assembly;
   a bellows system coupled to the dome assembly, and comprising:
      a piston dividing the bellows system into a dome side and a valve side;
      a first bellows assembly positioned within the dome side of the bellows system and in fluid communication with the dome assembly; and
      a second bellows assembly positioned within the valve side of the bellows system;
   a valve assembly in fluid communication with the second bellows assembly and operable to shift the IPO gas lift valve between an open position and a closed position and comprising:
      a housing comprising an upper housing coupled to a lower housing, wherein one or more spacers are positioned between the upper housing and the lower housing;
      a valve stem positioned within the housing and coupled to the piston, the valve stem comprising a seal portion;
      a valve seat having an outlet and shaped to receive the seal portion of the valve stem when the IPO gas lift valve is in the closed position; and
      a check valve assembly coupled to the valve assembly.

10. The IPO gas lift valve of claim 9, wherein the check valve assembly is positioned downstream of the outlet.

11. The IPO gas lift valve of claim 9, further comprising a pair of seal stacks positioned to create a seal between the IPO gas lift valve and the tubular.

12. A gas lift system for use within a well, the gas lift system comprising:

a tubular positionable within the well; and an IPO gas lift valve positioned within the tubular and comprising:

a dome assembly;

a bellows system coupled to the dome assembly, and comprising:

a piston dividing the bellows system into a dome side and a valve side;

a first bellows assembly positioned within the dome side of the bellows system and in fluid communication with the dome assembly; and a second bellows assembly positioned within the valve side of the bellows system;

a valve assembly in fluid communication with the second bellows assembly and operable to shift the IPO gas lift valve between an open position and a closed position and comprising:

a housing comprising an upper housing coupled to a lower housing, wherein one or more spacers are positioned between the upper housing and the lower housing;

a valve stem positioned within the housing and coupled to the piston, the valve stem comprising a seal portion;

a valve seat having an outlet and shaped to receive the seal portion of the valve stem when the IPO gas lift valve is in the closed position; and a check valve assembly coupled to the valve assembly.

13. The gas lift system of claim 12, wherein the check valve assembly is positioned downstream of the outlet.

14. The gas lift system of claim 12, wherein the IPO gas lift valve further comprises a pair of seal stacks positioned to create a seal between the IPO gas lift valve and the tubular.

15. The gas lift system of claim 14, wherein the seal stacks are further positioned to isolate an injection inlet port of the IPO gas lift valve from the tubular.

16. A method for producing formation fluids from a formation, the method comprising:

biasing an IPO gas lift valve in a closed position via pressurized gas within a dome assembly of the IPO gas lift valve, wherein:

the dome assembly in fluid communication with a first bellows assembly of a bellows system of the IPO gas lift valve;

the first bellows assembly is positioned within a dome side of a liquid-filled sealed chamber of the bellows system, wherein the first bellows assembly includes a first dome side bellow and a second dome side bellow, the first dome side bellow having a first dome side diameter that is less than a second dome side diameter of the second dome side bellow;

positioning a tubular string comprising the IPO gas lift valve within a wellbore extending through the formation;

injecting gas into the wellbore to pressurize a second bellows assembly of the bellows system and open the IPO gas lift valve, wherein the second bellows assembly includes a first valve side bellow and a second valve side bellow, the first valve side bellow having a first valve side diameter that is less than a second valve side diameter of the second valve side bellow, and wherein:

the second bellows assembly is positioned within a valve side of the liquid-filled sealed chamber, the valve side separated from the dome side via a piston.

17. The method of claim 16, wherein:

the first bellows assembly and the second bellows assembly each include a first bellows and a second bellows; and a first diameter of the first bellows is greater than a second diameter of the second bellows.

18. A method for producing formation fluids from a formation, the method comprising:

biasing an IPO gas lift valve in a closed position via pressurized gas within a dome assembly of the IPO gas lift valve, wherein:

the dome assembly in fluid communication with a first bellows assembly of a bellows system of the IPO gas lift valve; and the first bellows assembly is positioned within a dome side the bellows system;

positioning a second bellows assembly of the bellows system in a fully nested position when the IPO gas lift valve is in the closed position, wherein:

the second bellows assembly is positioned within a valve side of the bellows system; and the valve side is separated from the dome side via a piston;

positioning a tubular string comprising the IPO gas lift valve within a wellbore extending through the formation; and injecting gas into the wellbore to pressurize the second bellows assembly and open the IPO gas lift valve.

19. The method of claim 18, further comprising positioning a check valve assembly of the IPO gas lift valve downstream of an outlet of the IPO gas lift valve.

* * * * *